June 8, 1965  R. D. COPE  3,187,645
RECIPROCATING HYDRAULIC MOTOR
Filed Oct. 2, 1961
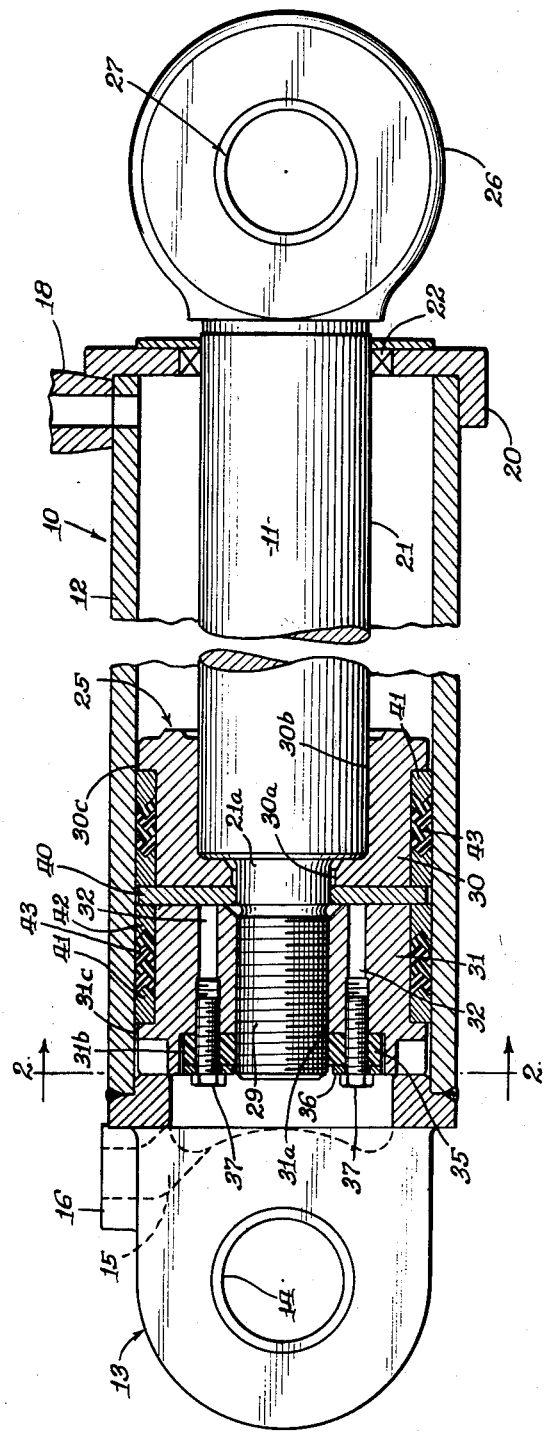
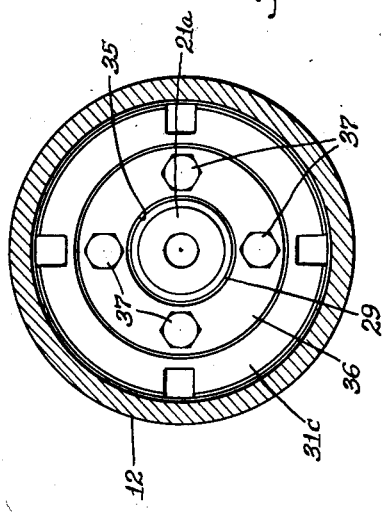
INVENTOR.
R. Duane Cope
BY Paul O. Pippel
Atty.

United States Patent Office 3,187,645
Patented June 8, 1965

3,187,645
RECIPROCATING HYDRAULIC MOTOR
R. Duane Cope, Deerfield, Ill., assignor to The Frank G. Hough Co., a corporation of Illinois
Filed Oct. 2, 1961, Ser. No. 142,167
4 Claims. (Cl. 92—258)

This invention relates generally to reciprocating hydraulic motor constructions, and more particularly to piston constructions for a reciprocating hydraulic motor.

The primary object of the invention is to provide a novel piston construction for a reciprocating hydraulic motor which is relatively simple to construct and assemble using continuous ring sealing members.

A further object of the invention is to provide a novel piston construction for a reciprocating hydraulic motor of a relatively large size such as used in larged earth moving machines, which will efficiently operate under the application of relatively high loading forces.

Still another object of the invention is to provide a novel piston construction for a reciprocating hydraulic motor which obviates the need for relatively large nuts to secure the piston head to the piston rod.

Still another object is to provide a novel piston construction for a reciprocating hydraulic motor wherein the securing means for maintaining the piston head on the piston rod efficiently secures the piston head against accidental loosening from the piston rod.

Other objects and features of the present invention will be apparent upon a perusal of the following specification and drawing, in which:

FIGURE 1 is a side elevational view, substantially in cross section, of a reciprocating hydraulic motor embodying the present invention, and FIGURE 2 is a cross-sectional view of the device shown in FIGURE 1 and taken substantially along the line 2—2 of FIGURE 1.

The present embodiment is the preferred embodiment, but it is to be understood that changes can be made in the present embodiment by one skilled in the art without departing from the spirit and scope of the present invention.

Generally, the present invention comprises a reciprocating hydraulic motor having a cylinder assembly with a piston assembly slidably carried therein for reciprocating movement relative to the cylinder. Hydraulic fluid ports are provided at each end of the cylinder for connection of hydraulic fluid conduits thereto for operation of the motor.

The novel piston construction comprises the forming of the piston rod at one end thereof with a reduced diameter. The reduced portion is substantially threaded. Two annular piston head sections are provided. The axial holes through one of the piston head sections is formed of two different diameters with the diameter of the larger hole substantially equal to the diameter of the major portion of the piston rod and with the diameter of the smaller hole slightly larger than the diameter of the reduced end portion of the piston rod. The axial hole through the other piston head section is also formed of two different diameters. The diameter of the smaller hole is substantially equal to the diameter of the reduced end portion of the piston rod, and that smaller hole is also threaded. The hole of the larger diameter forms a shallow annular recess for receiving a plastic or elastomer jam ring and compression washer therein.

Each piston head section is provided with an annular shoulder about the outer periphery and at one end or side thereof for retaining one side of one of two sets of bearings and sealing rings against axial movement relative to the piston head sections. The two sets of bearing and sealing rings are separated by a relatively large washer or ring which also separates the two piston head sections.

In the assembly of the piston head assembly, the piston head section which is not threaded is inserted over the reduced end portion of the piston rod with the hole of the larger diameter extending over the large portion of the piston rod adjacent to the reduced end portion thereof. With the bearing and sealing ring washer in place, the other piston head section is threaded onto the reduced end portion with the annular recess thereof positioned toward the end of the piston rod. The second or other piston head section is threaded onto the reduced end portion sufficiently to relatively tightly maintain the various parts of the piston head assembly together as a unit on the piston rod. Four spaced apart threaded holes are provided in the second piston head sections. These threaded holes terminate in the annular recess thereof and are equally spaced about the axis thereof.

A jam ring which may be formed of a material such as nylon, is inserted into the annular recess of the second piston head section and a compression washer is placed against the outward side of the nylon jam ring. Four cap screws are then inserted through suitable aligned holes in the compression washer and the nylon jam ring and threaded into the four threaded holes in the second piston head section. The cap screws are tightly torqued therein to force the compression washer tightly against the nylon jam ring. The nylon jam ring will be somewhat extruded or deformed into tight engagement with the threads on the end of the reduced end portion of the piston rod. The piston assembly may then be inserted in the cylinder assembly for reciprocating movement relative thereto, and in the operation of the motor, the described arrangement will efficiently perform under conditions of high loading on the piston head assembly with a minimum of danger of an accidental loosening of the piston head sections from the piston rod.

In detail, the reciprocating hydraulic motor comprises a cylinder assembly 10 and a piston assembly 11 slidably carried therein for relative reciprocating movement therebetween.

The cylinder assembly 10 comprises a cylindrical tube 12 with an internal surface which is relatively smooth. The head end of the cylinder 12 is provided with an end member 13 which is secured over the end of the cylinder 12 by any suitable means such as welding. The end member 13 is provided with a hole therethrough, and a bushing 14 is carried in that hole for connection of the head end of the motor in some tool arrangement. The end member 13 is further provided with a passageway 15 extending from a port 16 on the outer surface thereof into a recess which opens into the cylinder 12.

The rod end of the cylinder 12 is provided with a port 18 therethrough for the connection of a hydraulic fluid conduit thereto to deliver hydraulic fluid to the rod end of the cylinder 12. The rod end of the cylinder 12 is also provided with an end member 20 which may be secured thereto by any suitable means. The end member 20 is provided with a hole axially therethrough for the piston rod 21 of the piston assembly 11. Any suitable sealing means, as at 22, is provided between the rod end of the cylinder 12 and the piston rod 21 to permit reciprocation of the piston assembly 11 relative to the cylinder assembly 10 without the leakage of any appreciable amount of hydraulic fluid between the end member 20 and the piston rod 21.

The piston assembly 11 comprises, in addition to the piston rod 21, a piston head assembly 25 carried on the inner end of the piston rod 21. The outer end of the piston rod 21 is provided with a member 26 having a hole therethrough which carries a bushing 27 for pivotally connecting the motor in a tool arrangement.

The inner end of the piston rod 21 is formed with a reduced diameter portion 21a. The reduced portion 21a is partially threaded with threads 29 extending from a point spaced from the major large portion of the piston rod 21 to the end of the reduced portion 21a.

The piston head assembly 25 further comprises two annular piston head sections 30 and 31. The axial opening through piston head section 30 is formed as two contiguous holes of different diameters, the smaller hole designated 30a and the larger hole designated 30b. The diameter of hole 30b is substantially equal to that of the major large portion of the piston rod 21. The diameter of the hole 30a is slightly larger than the diameter of the reduced end portion 21a. The piston head section 30 is further provided with an annular shoulder 30c which is formed about the outer periphery thereof on the side of hole 30b. The outer diameter of shoulder 30c is slightly less than the inner diameter of the cylinder 12.

The axial opening through the piston head section 31 is also formed as two contiguous holes of different diameters, as hole 31a and hole 31b. Hole 31a is of a diameter substantially equal to the diameter of the reduced portion 21a, and is threaded for cooperation with the threads 29. The hole or recess 31b has a diameter substantially greater than the diameter of portion 31a. Piston head section 31 is also provided with an annular shoulder 31c formed on the outer periphery thereof at one side thereof. Shoulder 31c is positioned on the same side of piston head section 31 as the end of recess 31b. The outer diameter of portion 31c is slightly less than the inner diameter of the cylinder 12. Piston head section 31 is further provided with four holes 32 which are positioned in a spaced apart relationship to each other. The holes 32 are aligned parallel to the axis of the piston head section 31 and are formed through the radially extending wall portion of the recess 31b. The holes 32 are further threaded for a portion of their depth extending from recess 31b.

The piston head assembly 25 further comprises a plastic or elastomer jam ring 35, a compression washer 36 and four cap screws 37. The plastic or elastomer jam ring 35 may be formed of a material such as nylon. The jam ring 35 has an outer diameter slightly less than the diameter of the recess 31b, and an inner diameter substantially equal to the diameter of the reduced portion 21a of the piston rod 21. The jam ring 35 has considerable thickness so that upon the deformation thereof it may engage the threads 29 of the piston rod 21 over a considerable area thereof. The compression washer which may be formed of a material such as steel has an outer diameter substantially equal to the outer diameter of the jam ring 35 and an inner diameter slightly larger than the diameter of the reduced end portion 21a of the piston rod 21. The jam ring 35 and the compression washer 36 are each provided with four holes therethrough which may be aligned with the four holes 32 of the piston head section 31. The four cap screws 37 are of a size for cooperation with the threads formed in the holes 32 of the piston head section 31.

The piston head assembly 25 further comprises a relatively large washer 40 and two bearing rings 41, two bearing rings 42, and a plurality of sealing rings 43. The relatively large washer 40 has an outer diameter slightly less than the inner diameter of the cylinder 12 and an inner diameter substantially equal to the diameter of the reduced portion 21a of the piston rod 21.

The bearing rings 41 and 42 and the sealing rings 43 have an outer diameter which is substantially equal to the inner diameter of the cylinder 12, and an inner diameter which is substantially equal to the outer diameter of the piston head sections 30 and 31. The sealing rings 43 are somewhat V-shaped in cross section and are formed of a fabric impregnated with a resilient material such as rubber or neoprene. The bearing rings 41 and 42 are formed of a relatively soft bearing metal such as bronze. One side of each of the bearing rings 41 is formed with a somewhat V-shaped projection conforming to the V-shaped recess on one side of the sealing rings 43. The bearing rings 42 are formed on one side thereof with a somewhat V-shaped recess for cooperation with the projecting sides of the sealing rings 43.

The piston head assembly 25 is initially assembled on the piston rod 21 before the piston rod 21 is inserted in the cylinder 12. The piston head section 30 with one set of bearing rings 41 and 42 and sealing rings 43 positioned about the periphery thereof, is mounted on the piston rod 21 with the portion having the hole 30b extending over the portion of the piston rod 21 adjacent the reduced portion 21a, and with the portion having the hole 30a positioned about the reduced portion 21a of the piston rod 21. The inner wall of the piston head section 30 extending from the hole 30a to the hole 30b is positioned to engage the side wall of the piston rod 21 which extends radially from the reduced portion 21a to the large diameter portion of the piston rod 21. The relatively large washer 40 is then mounted on the reduced portion 21a against the piston head section 30.

The piston head section 31 is then threaded over the reduced portion 21a of the piston rod 21 until the piston head section 31 securely engages the washer 40 to project the washer 40 and the piston head section 30 against the wall of the piston rod 21 which extends radially from the reduced portion 21a to the large diameter portion thereof.

The other set of bearing rings 41 and 42 and sealing rings 43 are mounted on the outer periphery of the piston head section 31 before the piston head section 31 is threaded onto the reduced end portion 21a of the piston rod 21. It thus may be seen that each set of bearing rings 41 and 42 and sealing rings 43 is securely retained against axial movement relative to the piston head sections 30 and 31 by the annular shoulders 30c and 31c and the sides of the washer 40.

The jam ring 35 is then inserted into the recess 31b over the end of the reduced end portion 21a of the piston rod 21. The compression ring 36 is then positioned against the outward side of the jam ring 35, and the holes through the compression ring 36 and the jam ring 35 are axially aligned with the four holes 32 in the piston head section 31. The four cap screws 37 are then inserted through the holes in the compression ring 36 and the jam ring 35, and threaded into the holes 32 of the piston head section 31. Considerable torque is applied to the cap screws 37 to force compression ring 36 against the jam ring 35 to deform the jam ring 35 radially inwardly into tight engagement with the end of the reduced end portion 21a of the piston rod 21. The tight engagement of the jam ring 35 with the reduced end portion 21a of the piston rod 21 will prevent the piston head section 31 from loosening as the piston assembly 11 is moved in the cylinder assembly 10 in a reciprocating movement relative thereto. The recess 31b and the compression ring 37 function to confine the jam ring 35 when it is deformed by the tightening of the cap screws 37.

Having described the invention, what is considered new and desired to be protected by Letters Patent is:

1. A piston assembly for a reciprocating hydraulic motor comprising, a piston rod having a threaded portion, a piston head threaded over said threaded portion of said piston rod, said piston head having an annular recess formed therein and concentrically positioned about the threaded end portion of said piston rod, an elastically deformable ring positioned in said recess about said threaded end portion of said piston rod, a compression ring positioned about the outward side of said deformable ring and in said recess, and means carried on one of said piston head and said piston rod and engaging said compression ring to deform said deformable ring into tight engagement with said threaded end portion of said piston rod whereby said deformable ring is in sealing and frictional engagement with said threaded portion.

2. A piston assembly for a reciprocating hydraulic motor comprising, a piston rod having a threaded portion, a piston head threaded over said threaded portion of said piston rod, said piston head having an annular recess formed therein and concentrically positioned about the threaded end portion of said piston rod, an elastically deformable ring positioned in said recess about said threaded end portion of said piston rod, a compression ring positioned against the outward side of said deformable ring and in said recess, and a plurality of fasteners journaled in a spaced apart relationship to each other through said compression ring and said plastic ring and threaded into said piston head to force said compression ring against said outward side of said deformable ring to deform said plastic ring into tight engagement with said threaded end portion of said piston rod whereby said elastically deformable ring will act as a seal between said threaded end portion and said piston head, and will prevent rotation of said piston head relative to said piston rod.

3. A piston assembly for a reciprocating hydraulic motor comprising, a piston rod having a threaded end portion, a piston head threaded over said end portion of said piston rod, said piston head having an annular recess formed therein and concentrically positioned about said threaded end portion of said piston rod, a deformable ring positioned in said recess about said threaded end portion of said piston rod, said deformable ring having an inner diameter substantially equal to the diameter of said threaded end portion of said piston rod and an outer diameter substantially equal to the diameter of said recess, a compression ring positioned against the outward side of said deformable ring and in said recess, said compression ring having an inner diameter substantially equal to the inner diameter of said deformable ring and an outer diameter substantially equal to the diameter of said recess, and means for keying said deformable ring to said piston head and forcing said compression ring against said outward side of said deformable ring to deform said deformable ring into tight engagement with said threaded end portion of said piston rod whereby said deformable ring will act as a seal between said threaded end portion and said piston head, and will prevent rotation of said piston head relative to said piston rod.

4. A piston assembly for a reciprocating hydraulic motor comprising, a piston rod of a certain diameter and having a reduced diameter portion at one end thereof, said reduced end portion being threaded, two annular piston head sections, one of said piston head sections having a portion of the hole therethrough of said certain diameter and having the remaining portion of the hole therethrough of a diameter slightly larger than the diameter of said reduced end portion, the other of said piston head sections having the hole therethrough of a diameter substantially equal to the diameter of said reduced end portion and being threaded, said other piston head section further having an annular recess formed therein at one end thereof and concentrically positioned about the threaded hole therethrough, said one piston head section being positioned on said piston rod with the radially disposed inner wall thereof positioned against the radial wall portion of said piston rod extending from said reduced end portion to said certain diameter, said other piston head section threaded over said threaded end portion of said piston rod and in tight engagement with said one piston head section and with said annular recess being positioned substantially concentrically about the end portion of said reduced end portion, an elastically deformable ring positioned in said recess about said end portion of said piston rod, a compression ring positioned about the outward side of said deformable ring and in said annular recess, and means keying said plastic ring to said other piston head section and forcing said compression ring against said outward side of said plastic ring to deform said plastic ring into tight engagement with said end portion of said piston rod whereby said deformable ring will act as a seal between said threaded end portion and said other piston head, and will prevent rotation of said other piston head relative to said piston rod.

References Cited by the Examiner
UNITED STATES PATENTS

| 2,647,769 | 8/53 | Smith | 277—166 |
| 2,801,139 | 7/57 | Waibel | 309—17 X |
| 3,036,873 | 5/62 | Norwood | 390—17 |
| 3,054,628 | 9/62 | Hardy | 285—423 |

FOREIGN PATENTS

| 521,822 | 3/21 | France. |
| 6,300 | 11/10 | Great Britain. |
| 106,431 | 5/17 | Great Britain. |
| 116,961 | 7/18 | Great Britain. |
| 129,587 | 7/19 | Great Britain. |
| 852,757 | 11/60 | Great Britain. |
| 86,114 | 3/57 | Netherlands. |

M. HENSON WOOD, Jr., *Primary Examiner.*

KARL J. ALBRECHT, CARL W. TOMLIN, *Examiners.*